United States Patent
Eisen

(10) Patent No.: US 11,883,861 B2
(45) Date of Patent: Jan. 30, 2024

(54) CLEANING DEVICE FOR A DRINKING STRAW

(71) Applicant: VitaJuwel GmbH, Scheidegg (DE)

(72) Inventor: Ewald Eisen, Scheidegg (DE)

(73) Assignee: VitaJuwel GmbH, Scheidegg (DE)

( * ) Notice: Subject to any disclaimer, the term of this patent is extended or adjusted under 35 U.S.C. 154(b) by 118 days.

(21) Appl. No.: 17/621,809

(22) PCT Filed: Jun. 25, 2020

(86) PCT No.: PCT/EP2020/067920
§ 371 (c)(1),
(2) Date: Dec. 22, 2021

(87) PCT Pub. No.: WO2020/260512
PCT Pub. Date: Dec. 30, 2020

(65) Prior Publication Data
US 2022/0258215 A1    Aug. 18, 2022

(30) Foreign Application Priority Data

Jun. 25, 2019 (DE) .......................... 102019117115.6

(51) Int. Cl.
*B08B 9/032* (2006.01)
*A47G 21/18* (2006.01)
*B33Y 80/00* (2015.01)

(52) U.S. Cl.
CPC ............ *B08B 9/0321* (2013.01); *A47G 21/18* (2013.01); *B08B 2209/032* (2013.01); *B33Y 80/00* (2014.12)

(58) Field of Classification Search
None
See application file for complete search history.

(56) References Cited

U.S. PATENT DOCUMENTS 10,123,641 B1 * 11/2018 Pepper ................ A47G 21/189
2017/0216890 A1    8/2017 Jacob

FOREIGN PATENT DOCUMENTS

CN         206334891 U    7/2017
CN         206868698 U    1/2018
(Continued)

OTHER PUBLICATIONS

English Machine Translation KR20160045511A.*
(Continued)

*Primary Examiner* — Natasha N Campbell
*Assistant Examiner* — Pradhuman Parihar
(74) *Attorney, Agent, or Firm* — Bachman & LaPointe, P.C.

(57) ABSTRACT

The present invention relates to a cleaning device for drinking straws. The cleaning device can be divided into a connection portion, an outlet portion, and a manipulation portion therebetween. The connection portion is connected fluidically to the outlet portion via the manipulation portion. The connection portion can be configured such that a firm but removable connection of the cleaning device to a water tap can be produced. The outlet portion is designed with receiving structure for receiving a drinking straw. The receiving structure has a sealing surface such that a drinking straw can be tightly received by the outlet portion when in contact with the said sealing surface. The cleaning device can be designed such that a ratio of the inlet cross section to the outlet cross section is more than 10.

19 Claims, 3 Drawing Sheets

(56) References Cited

FOREIGN PATENT DOCUMENTS

| CN | 208711972 U | 4/2019 | |
|---|---|---|---|
| DE | 202013105773 U1 | 1/2014 | |
| EP | 1946854 A1 | 7/2008 | |
| KR | 101525348 B1 | 6/2015 | |
| KR | 20160045511 A * | 4/2016 | ............... B08B 9/02 |
| KR | 20160045511 A | 4/2016 | |
| WO | 2017182147 A1 | 10/2017 | |

OTHER PUBLICATIONS

Kasinatorrh, "Straw Washing Adapter (Reuse/Recycling)"., www.thingiverse.com., May 18, 2019.
International application No. PCT/EP2020/067920 dated Sep. 17, 2020.
Office Action dated Nov. 30, 2022 for corresponding application CN202080046683.8.
Office Action dated Oct. 28, 2023 for corresponding application CN202080046683.8.

* cited by examiner

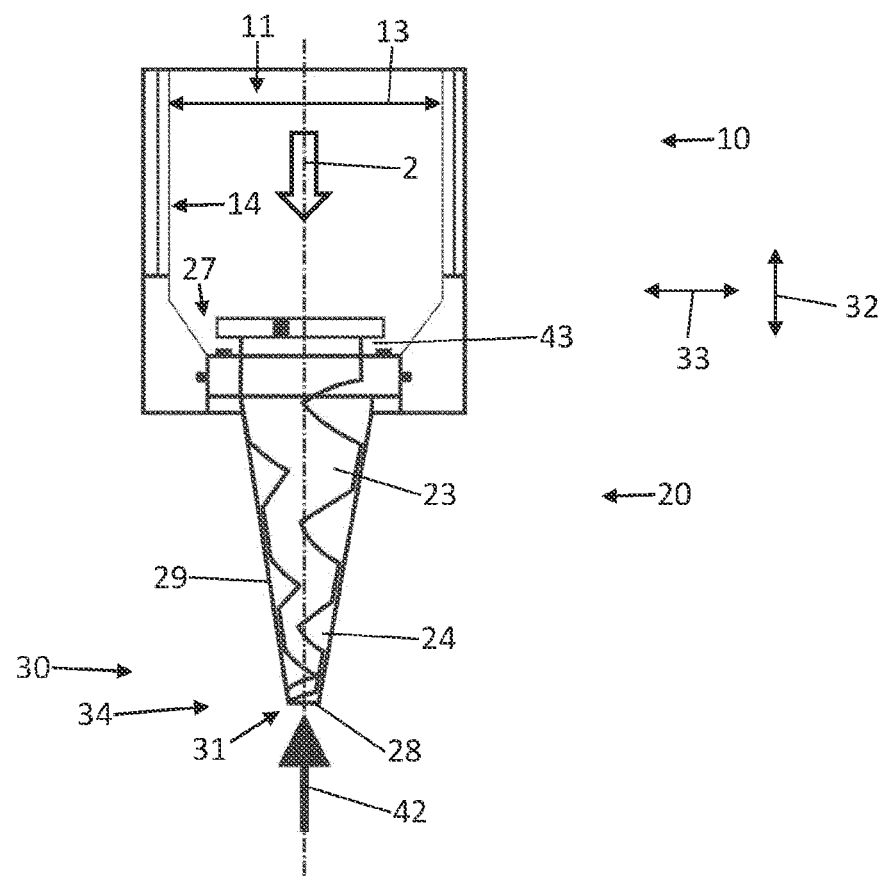

CLEANING DEVICE FOR A DRINKING STRAW

BACKGROUND OF THE INVENTION

The present invention relates to a cleaning device for tubular drinking aids, in particular for drinking straws, commonly called "straws".

It is known that consumers like to consume beverages with the aid of drinking straws. One end of a drinking straw is immersed in a liquid beverage and another end is taken into the mouth of the drinking person. The beverage is transported into the mouth by producing a negative pressure in the mouth cavity of the drinking person.

Such drinking straws are well-known and widespread. In addition, these drinking straws are usually produced from plastic for single use. Accordingly, single-use drinking straws cause a considerable amount of waste.

Reusable drinking straws are also known, consisting for example of durable plastic, glass, metal etc., which have to be cleaned after use.

The cleaning of a drinking straw is often laborious and inefficient, since for example special, very thin brushes or similar aids are used.

SUMMARY OF THE INVENTION

It is therefore an object of the present invention to provide a device for cleaning the drinking straw, which has a simple and robust structure and at the same time provides an improvement in the use and the cleaning result.

The above object is achieved by a cleaning device for a drinking straw as disclosed herein.

The cleaning device suitable for cleaning a drinking straw can be divided into a connection portion, an outlet portion, and a manipulation portion therebetween. In particular, the division into the portions acts to show the function of the cleaning device in a structured manner; the portions can also be completely or at least partially differentiated from one another structurally. For example, it is conceivable for the cleaning device to have, in particular structurally, a connection portion, a manipulation portion adjoining and therefore connected thereto, and an outlet portion adjoining and therefore connected thereto.

The connection portion is connected fluidically, i.e., to conduct a fluid and/or fluid flow, to the outlet portion via the manipulation portion, and the cleaning device has an inlet cross section and an outlet cross section. Preferably, the inlet cross section is formed by an area of the inlet cross section, i.e., by a cross-sectional area and/or a diameter of the connection portion, and the outlet cross section is correspondingly formed by an area of the outlet cross section, i.e., by a cross-sectional area and/or by the outlet portion.

The cleaning device is designed in principle to conduct a fluid but preferably to conduct a liquid, in particular a cleaning liquid, in particular water. Wherever a fluid is mentioned below, this always includes an embodiment of a gaseous and/or liquid fluid.

The manipulation portion also has dynamic means for manipulating the fluid flow through the cleaning device. The dynamic means is characterised in that the flow dynamics of the fluid are increased by the dynamic means on flowing through the manipulation portion.

It is disclosed that the manipulation portion and/or the dynamic means is/are configured such that a flow cross section through the manipulation portion decreases monotonously from the inlet cross section to the outlet cross section, completely or at least in sections or continuously. As a result, a fluid flowing through the cleaning device is manipulated particularly efficiently in the manipulation portion, for example by the introduction of eddies, rotations and/or increases in flow speeds. This in turn means that the fluid flowing out of the outlet portion via the receiving means into a drinking straw can have a particularly good cleaning effect. Preferably, the manipulation portion has a nozzle-like design, so that the flow speed of the fluid increases between the inlet cross section and the outlet cross section.

The dynamic means have at least one flow manipulator which is shaped and arranged in the manipulation means such that a rotational component of motion can be imposed on the fluid flowing through the cleaning device. The rotational component of motion preferably effects a swirl-like spiral motion of the fluid in the circumferential direction. In this manner, the fluid leaves the outlet portion of the cleaning device at an increased axial speed and/or with a circular component of motion oriented in the circumferential direction. Charged in this way, the fluid dynamised in this manner can enter the drinking straw to be cleaned and entrains dirt particles adhering therein in an improved manner.

Additionally to or independently of this, the manipulation portion can be understood as an intermediate portion between the connection portion and the outlet portion.

Additionally or alternatively, the inlet cross section can be located at the inlet of the manipulation portion, and the outlet portion can be located at the outlet of the manipulation portion.

The connection portion can preferably be configured such that a firm but removable connection of the cleaning device to a water tap, in particular to a tap outlet of the water tap, can be produced. For example, the connection portion is designed at least partially with a cylindrical connection inner surface so that the connection portion can be pushed over an outer cylindrical surface of the tap outlet and thus enters into a firm, tight and removable connection.

According to one embodiment, the connection portion is produced with a connection inner surface with an inner diameter, in particular in one piece, from an elastomer, from silicone, acrylate rubber or from natural rubber, such that the cleaning device can be plugged onto a tap outlet of a water tap of a kitchen sink, in particular wherein the tap outlet has a maximum outer diameter of more than 15 mm, in particular more than 20 mm, preferably more than 22 mm, and/or less than 35 mm, in particular less than 30 mm, preferably less than 28 mm, and/or about 20 mm, about 25 mm, and/or about 30 mm. A corresponding standard tap outlet has a cylindrical portion with an outer cylindrical surface on which the connection inner surface of the connection portion can be placed. In particular, within the context of the present patent application, a water tap of a bathroom fitting or toilet fitting does not count as a water tap of a kitchen sink.

The outlet portion is designed with receiving means for receiving a drinking straw. To this end, the receiving means have a sealing surface such that a drinking straw can be tightly received by the outlet portion when in contact with the said sealing surface.

The receiving means is designed such that a drinking straw having an outer diameter of at least 2 mm, preferably at least 3 mm, particularly preferably at least 4.5 mm and/or not more than 10 mm, preferably not more than 8 mm, particularly preferably 6.5 mm can be received in an effectively sealed manner.

On the basis of the receiving means for the drinking straw, an axial direction, a radial direction and a circumferential direction are defined, the sealing surface of the receiving means being at least partially funnel-shaped in a frustoconical manner. In particular, the receiving means can be conical so that it forms a combined stop for the drinking straw in the radial direction and in the axial direction. The described frustoconical and/or conical shape relates in particular to a section in the axial direction of the receiving means.

A drinking straw is received tightly in the receiving means in that an axial edge of the drinking straw and/or a lateral wall in the region of an axial edge of the drinking straw forms a physical, tight contact with the sealing surface, in particular when the drinking straw is guided into/onto the receiving means.

According to one embodiment, a cross section of the sealing surface and/or multiple cross sections of the sealing surface spaced in the axial direction are at least partially circular or oval in the radial direction.

According to a further, in particular independent embodiment, the frustoconical and/or conical surface and/or the sealing surface of the receiving means is inclined at an angle of at least 8° with respect to the axial direction, in particular at least 10°, preferably at least 15°, in particular preferably at least 18°, and/or of not more than 45°, in particular not more than 30°, preferably not more than 25°, in particular preferably not more than 22°. This allows the drinking straw to be received particularly precisely and tightly on the sealing surface. With small angles, a clamping effect of the drinking straw in the receiving means can result, which simplifies handling of the cleaning process further.

According to one embodiment, the sealing surface for receiving a drinking straw can be configured on an outer surface of the receiving means or on an inner surface of the receiving means.

If the sealing surface is provided on the outer surface, the drinking straw is pushed at least partially over the receiving means so that the sealing surface bears against an inner surface of walls of the drinking straw, in particular against an inner edge region of the drinking straw. In this case, with optional reference to the aforementioned angles, the sealing surface is inclined at an angle, with respect to the axial direction, which is open counter to a flow direction of the fluid.

If the sealing surface is provided on the inner surface, the drinking straw for receiving is introduced at least partially into the receiving means, and the sealing surface encloses, i.e., fits over side walls and/or an outer edge region of the drinking straw. In this case, with optional reference to the aforementioned angles, the sealing surface is inclined at an angle, with respect to the axial direction, which is open in a flow direction of the fluid.

Furthermore, the cleaning device, the connection portion and/or the outlet portion can be designed such that a ratio of the inlet cross section to the outlet cross section is more than 10, in particular more than 15, preferably more than 20, in particular preferably more than 23, and/or less than 40, in particular less than 35, preferably less than 30, in particular preferably less than 28, and/or approximately 25. Preferably, the manipulation portion is used to reduce a flow cross section through the cleaning device from the inlet cross section to the outlet cross section in accordance with the described ratio. In this way, the kinetic and/or potential energy and/or flow conditions of a fluid flowing through the cleaning device is manipulated by the manipulation portion such that a fluid exiting from the cleaning device and flowing into a drinking straw placed thereon exerts a high mechanical cleaning effect on the inner surfaces of the drinking straw.

Within the context of the patent application, it is disclosed that at least the connection portion of the cleaning device and/or the receiving means of the outlet portion is/are produced partially or completely from a flexible material.

According to a development, at least the connection portion of the cleaning device and/or the receiving means of the outlet portion is/are produced from an elastomer, from silicone—or a material from the group of poly(organo) siloxanes—, from acrylate rubber or from natural rubber, in particular using a 3D printing process. Because, for example, the connection portion and/or the receiving means is/are designed to be flexible in this way, simple attachment of the cleaning device to a tap outlet and/or tight receiving of a drinking straw in the receiving means can be achieved.

According to a development, the dynamic means and/or the flow manipulator of the dynamic means are configured as a helical element with at least one, preferably with at least two, further preferably with at least three threads. Formation of a rotational component of motion of the fluid can thus be considerably improved.

Furthermore, the dynamic means and/or the flow manipulator can be designed as an element for insertion into the cleaning device and/or into the manipulation portion.

Preferably, the connection portion, the manipulation portion and the outlet portion can be produced in one piece from a flexible material, for example from the aforementioned materials. To this end, the dynamic means with one or more flow manipulators, preferably configured as a helical element with threads open in the radial direction, can be designed to be insertable into the manipulation portion so that the open threads of the helical element form closed threads with inner walls of the manipulation portion.

Furthermore, it is conceivable to configure the manipulation portion and the helical element such that the threads at least partially have a tapering flow cross section towards the receiving means. I.e., a flow cross section of a thread at the inlet of the manipulation means is larger than a flow cross section of a thread at the outlet of the manipulation means. In particular, the helical element and/or the manipulation portion is/are designed such that a flow cross section of the thread decreases monotonously.

According to a further embodiment, the helical element is configured such that a pitch of a thread relative to a cross-sectional plane spanned by the radial direction of the helical element is more than 20°, in particular more than 30°, preferably more than 35°, in particular preferably more than 40°, and/or less than 70°, in particular less than 60°, preferably less than 55°, in particular preferably less than 50°, and/or approximately 45°.

In the course of experiments, the applicant was able to identify correspondingly designed helical elements as advantageous, with which an ideal ratio of circumferential speed and/or rotational speed to flow speed in the axial direction of the receiving means is set. The ideal ratio is characterised in that the cleaning effect of the drinking straw is particularly high.

According to a further embodiment, a pitch of a thread in the region of the inlet of the manipulation portion or of the helical element is greater than a pitch in the region of the outlet. The pitch which thus decreases at least partially or continuously from the inlet cross section to the outlet cross section results in a particularly effective introduction of a rotational component into the motion of the fluid.

According to a further, in particular alternative aspect, the connection portion is formed as or with an adapter device for connection to a tap outlet or water tap. The adapter device is designed such that it can be connected fixedly but removably in particular to a thread of a water tap. For example, it is possible in this manner to fixedly connect the cleaning device at least temporarily to a water tap provided specifically therefor, preferably by means of an interlocking and/or frictional connection, e.g. by screwing on. Such a connection is particularly suitable for use of the cleaning device in a professional environment, for example in gastronomy, where there is a large number of drinking straws for cleaning.

Furthermore, it is disclosed that the cleaning device can have a valve device which is configured such that placement of a drinking straw on the receiving means of the outlet portion and/or with exertion of a contact force on same causes the valve device to open. Consequently, the cleaning device is always closed by means of the valve device as long as no drinking straw is placed on the receiving means and/or as long as no force is exerted on a part of the valve device or the cleaning device, for example by a finger.

As soon as such a contact force is exerted, in particular in the axial direction, on a valve device or a component of the valve device, a flow cross section of the valve device is released so that the fluid can flow through the cleaning device to the outlet portion.

In particular, the valve device is designed such that a flow cross section is closed by a valve component as long as a fluid under pressure loads the valve component and no contact force is exerted counter to the pressure force. The cleaning device can thus be operated in a simple manner.

The above-described embodiments can be combined with one another in any desired but practical manner; for example the connection portion can be configured with an adapter device for fixed but removable attachment to a water tap and at the same time a valve device for simplified operation can be provided. Such a combination is particularly suitable for professional use of the cleaning device.

BRIEF DESCRIPTION OF THE DRAWINGS

The attached drawings illustrate embodiments and, together with the description, are used to explain the principles of the invention. The elements of the drawings are relative to one another and not necessarily to scale.

The same reference signs denote the same or correspondingly similar parts.

FIG. 5 shows a longitudinal section through a third embodiment of a cleaning device.

DETAILED DESCRIPTION

Figure 1:
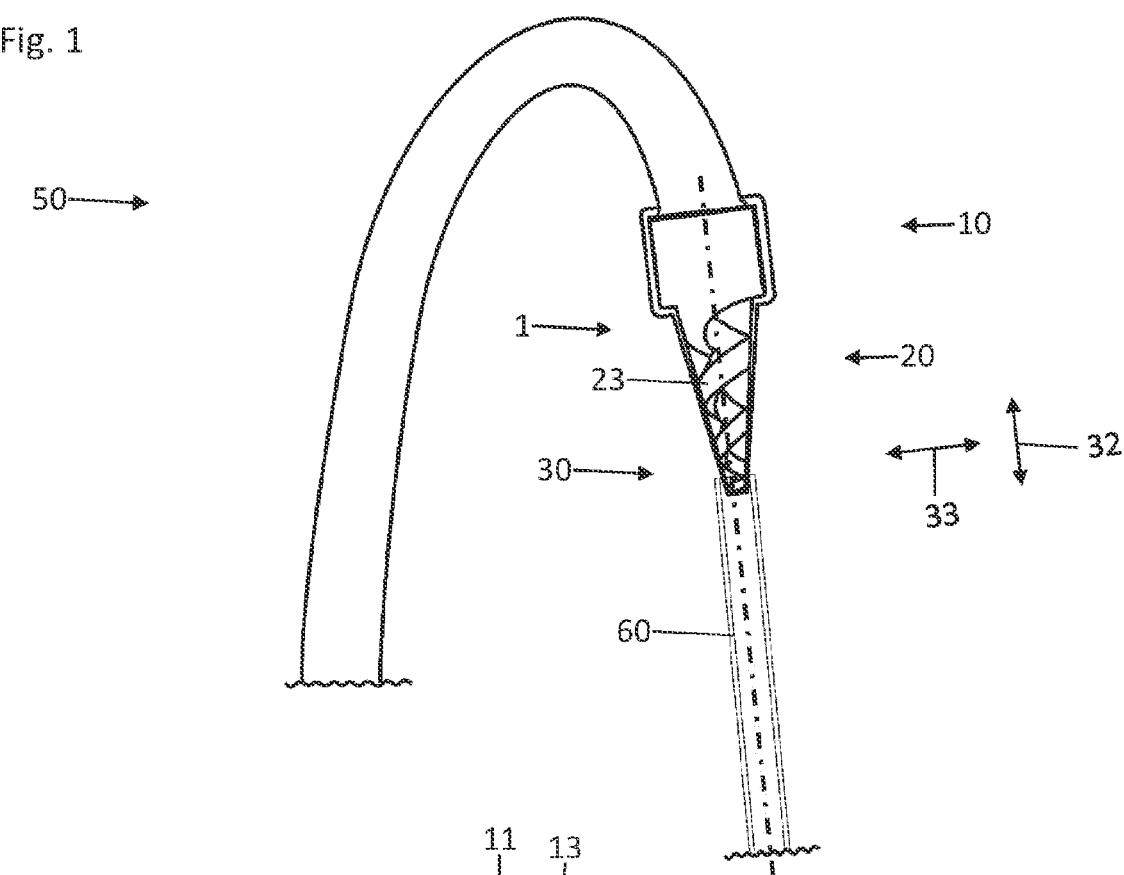
FIG. 1 shows a water tap having a tap outlet and a cleaning device placed thereon according to a first embodiment.

To assist overall understanding, FIG. 1 shows an exemplary water tap 50 having a tap outlet 51, on which a cleaning device 1 according to a first embodiment is arranged. An exemplary drinking straw 60 is shown placed onto an outlet portion 30 of the cleaning device.

In addition to the outlet portion 30, the cleaning device 1 has a manipulation portion 20 and a connection portion 10, the latter being used to connect the cleaning device 1 to the tap outlet 51.

Figure 2:
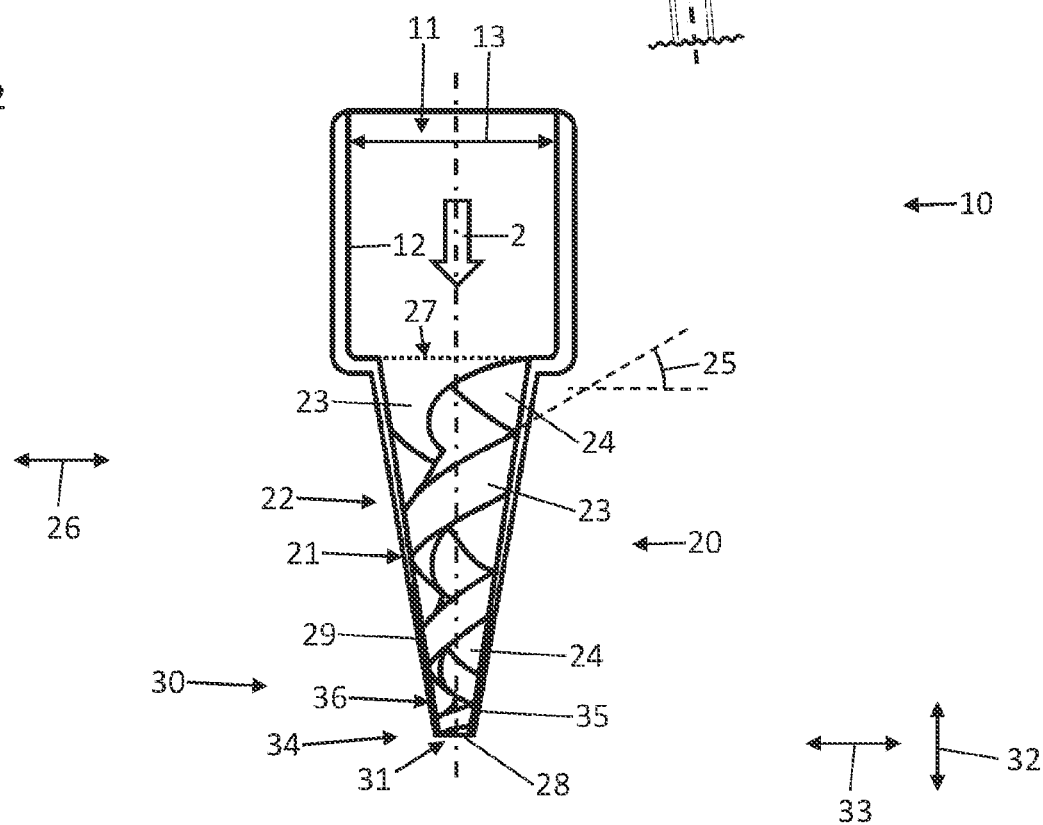
FIG. 2 shows a longitudinal section through the cleaning device according to FIG. 1.

FIG. 2 is used for more detailed description of the first embodiment of the cleaning device 1. The connection portion 10, a cross section of an inner diameter 13 and/or an inlet 27 can be used to define an inlet cross section 11 of the connection portion 10. The inlet 27 is shown with the aid of a dotted line, since this inlet 27 does not necessarily have to be configured as a component or object.

The connection portion 10 is equipped with a connection inner surface 12, which can be placed around the tap outlet 51 by being plugged on. At least the connection inner surface 12 or the entire connection portion 10 is produced from a flexible material, for example from silicone, so that the cleaning device 1 remains in the plugged-on state on the water tap 50 owing to a frictional connection between an outer cylindrical surface 52 of the tap outlet 51 and the connection inner surface 13. To this end, an inner diameter 13 of the connection portion 10 and a flexibility of the connection portion 10 are selected such that a normal water pressure at a water tap of a sink is not enough to remove the cleaning device 1, in particular in a closed state, from the tap outlet 51 by positive pressure.

At a lower end of the cleaning device 1 there is the outlet portion 30 with a receiving means 34 for receiving a drinking straw 60. An outlet cross section 31 is defined by a flow cross section of the receiving means 34 and/or by an outlet 28 of the manipulation portion 20. In particular, the outlet 28 and the outlet cross section 31 can directly coincide spatially.

The receiving means 34 (see also FIG. 3) defines an axial direction 32 and a radial direction 33; in the present embodiments, the radial direction 33 of the receiving means 34 coincides with a radial direction 26 of a helical element 23. However, such a coincidence can be omitted, depending on the design.

It is also clear from FIG. 2 that the manipulation portion 20 adjoins the connection portion 10 in the flow direction 2. The manipulation portion 20 exhibits dynamic means 21 with a flow manipulator 22 configured as a helical element 23. The helical element 23 has, in the radial direction 26 of the helical element 23, open threads 24, which, together with a wall 29 of the manipulation portion 20 form closed threads 24 for introducing a rotational component of motion into a fluid flowing through the cleaning device 1.

The helical element 23 can be shaped such that a certain pitch 25 is set in the circumferential direction of the helical element 23 in relation to a cross-sectional area formed by the radial direction 26 of the helical element 23.

Figure 3:
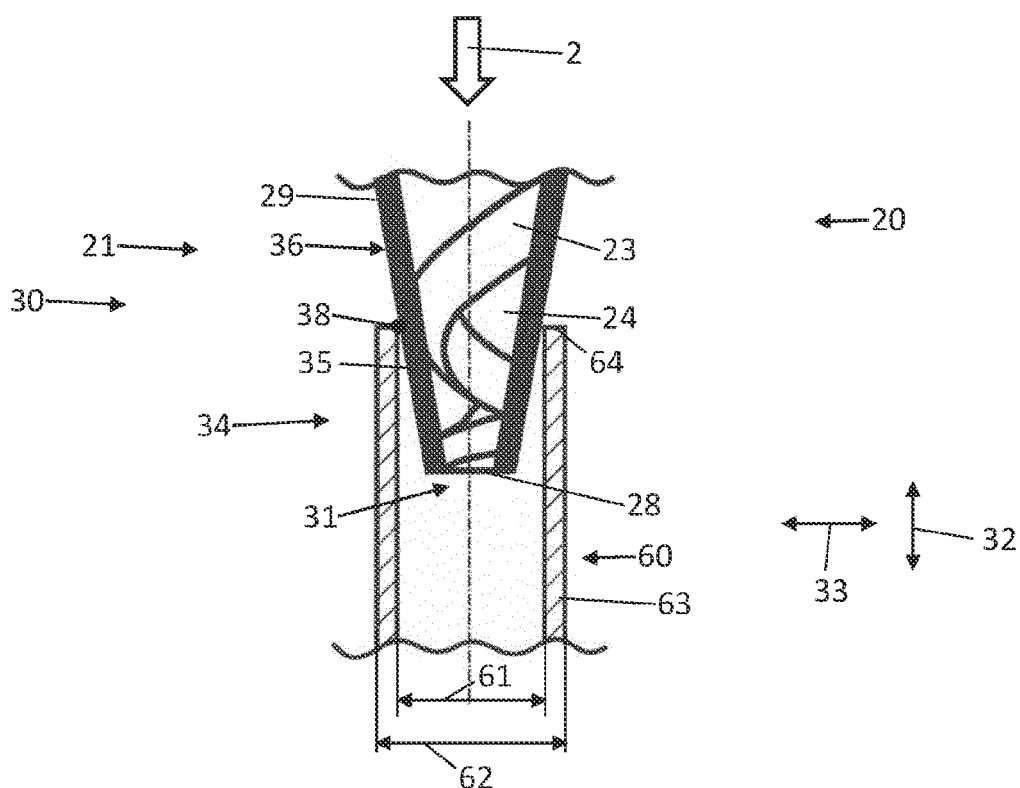
FIG. 3 shows a detail of a longitudinal section through the cleaning device according to FIG. 1.

FIG. 3 illustrates the structure of the outlet portion 30 of the first embodiment, shown in FIG. 2, of the cleaning device 1. In particular, the receiving of a drinking straw 60 on the receiving means 34 is described. The manipulation portion 20 with the helical element 23, the outlet 28 of which coincides directly with the outlet cross section 31 of the outlet portion 30, is shown only partially.

According to this embodiment but not limited thereto, the receiving means 34 of the outlet portion 30 is formed by an outer surface 36 of the wall 29 of the manipulation portion 20. To be able to produce a sealing contact between the drinking straw 60 and the receiving means 34, the drinking straw 60 is guided onto the receiving means 34 in the axial direction 32 and pressed thereon. An edge 64 of the wall 63 of the drinking straw 60 meets the conically shaped sealing surface 35 on the outer surface 36, as a result of which the sealing surface 35, the outer surface 36 and/or the wall 29 forms a combined axial and radial stop 38 for the drinking straw. The location of the effective, combined axial and radial stop 38 is determined in this case by an inner diameter 61 of the drinking straw 60. In particular, the receiving means 34 is designed to taper conically in the axial direction 32 and in the flow direction 2.

If the cleaning device 51 with the drinking straw 60 plugged thereon is on the water tap 50 and the latter is turned on, the fluid, in particular water, flows in the flow direction 2 into the connection portion 10, enters the manipulation portion 20, passes through the dynamic means 21 with the flow manipulator 22 in the form of a helical element 23, and enters the drinking straw 60 at the outlet 28 through the outlet cross section 31 of the outlet portion 30. Since the fluid has passed through the threads 24 of the dynamic means 21 of the manipulation portion 20, this fluid is highly turbulent and/or at least has a rotational component and as a result of the forces caused thereby has an improved capacity for cleaning an inner surface of the drinking straw 60.

Figure 4:
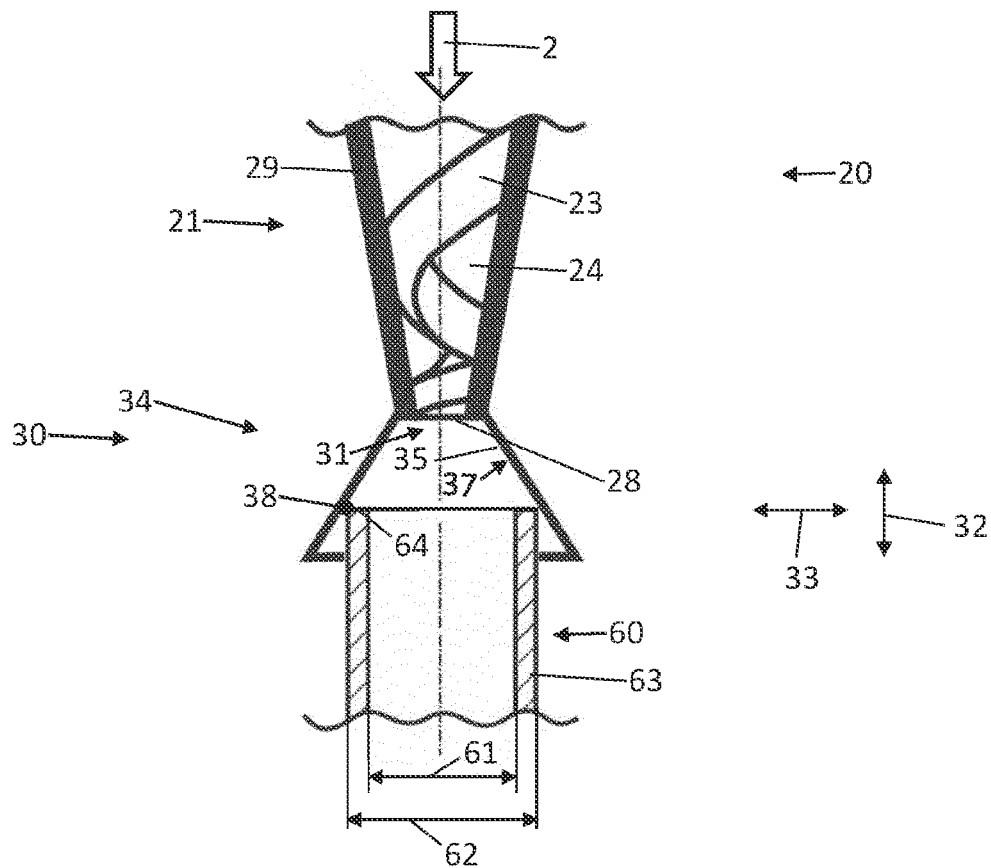
FIG. 4 shows a detail of a longitudinal section through a second embodiment of a cleaning device.

FIG. 4 shows a second, alternative exemplary embodiment of a cleaning device 1, in particular having an alternatively configured receiving means 34. In principle, the cleaning device 1 according to FIG. 4 differs from the cleaning device 1 according to FIG. 3 only by the receiving means 34. Accordingly, reference is made to the above statements for content which remains the same.

The receiving means 34 according to FIG. 4 is based on a reversed geometry of the receiving of the drinking straw 60 to the effect that the sealing surface 35 is situated on an inner surface 37 of the receiving means 34. The receiving means 34 is partially conical and widens in the axial direction 32 and in the flow direction 2, i.e., is designed with a diameter or flow cross section which increases in the flow direction 2, so that the combined stop 38 is formed on the inner surface 37 of the receiving means 34.

FIG. 5 describes a third exemplary embodiment of a cleaning device 1 having a valve device 40. In particular with respect to the outlet portion 30, the cleaning device 1 according to FIG. 5 is substantially identical to the first embodiment of a cleaning device 1 (FIGS. 1 to 3). Reference is accordingly made to the above statements.

However, the connection portion 10 is provided with an adapter device 15, so that the cleaning device 1 can be connected fixedly but removably to a thread of a tap outlet 51. Accordingly, the connection inner surface 12 is equipped with an internal thread 14.

The embodiment according to FIG. 5 also differs from the previous embodiments by the valve device 40, which can be operated by a contact force 42. The contact force 42 can be provided, for example, by a process of plugging a drinking straw 60 onto the outlet portion 30, in particular onto the outer sealing surface 35 of the receiving means 34. A valve component 41, which can comprise, for example, the flow manipulator 22, preferably in the form of the helical element 23, lifts correspondingly as a result of the contact force 42. As a result of this lifting, a valve cross section 43 is released and a fluid, in particular water, can flow through the manipulation means 20 towards the outlet cross section 31 in the flow direction 2.

According to a specific embodiment, the valve device 40 and the valve component 41 can be configured such that a fluid pressure present in the connection portion 10 closes the valve device 40 and holds it in the closed state when there is no contact force 42.

Wherever specific embodiments have been shown and described herein, it lies within the scope of the present invention to suitably modify the embodiments shown without departing from the scope of protection of the present invention. For example, the described third embodiment of the cleaning device 1 with a valve device 40 can be combined with a receiving means according to the second embodiment.

---

1 Cleaning device
2 Flow direction
10 Connection portion
11 Inlet cross section
12 Connection inner surface
13 Inner diameter
14 Thread
15 Adapter device
20 manipulation portion
21 Dynamic device
22 Flow manipulator
23 Helical element
24 Thread
25 Pitch
26 Radial direction
27 inlet
28 outlet
29 Wall of manipulation portion
30 Outlet portion
31 Outlet cross section
32 Axial direction
33 Radial direction
34 Receiving means
35 Sealing surface
36 Outer surface
37 Inner surface
38 Combined stop
40 Valve device
41 Valve component
42 Contact force
43 Valve cross section
50 Tap
51 Tap outlet
52 Outer cylinder surface
60 Drinking straw
61 inner diameter
62 Outer diameter
63 Wall
64 edge

---

The invention claimed is:

1. A cleaning device (1) for a drinking straw (60), comprising the drinking straw, a water tap, a connection portion (10) configured for firmly but removably connecting the cleaning device (1) to the water tap (50), an outlet portion (30) having a receiving means (34) with a defined axial direction (32) and radial direction (33) for receiving the drinking straw (60), and a manipulation portion (20), wherein the cleaning device (1) is configured with an inlet cross section (11) and an outlet cross section (31) such that the connection portion (10) is fluidically connected to the outlet portion (30) via the manipulation portion (20), wherein a ratio of an area of the inlet cross section (11) to an area of the outlet cross section (31) is more than 10, and less than 40, wherein the receiving means (34) is configured with a sealing surface (35) such that the drinking straw (60) can be tightly received by the outlet portion (30) when in contact with the sealing surface (35), and wherein the manipulation portion (20) comprises a dynamic means (21) for manipulating a fluid flow through the cleaning device (1), and the dynamic means (21) is equipped and configured with at least one flow manipulator (22) such that a rotational component of motion can be is imposed on a fluid flowing through the cleaning device (1), wherein the flow manipulator (22) is configured as a helical element (23) with at least one thread (24).

2. The cleaning device (1) according to claim 1, wherein the sealing surface (35) is configured at least partially frustoconical in the axial direction (32), and circular or oval in the radial direction (33), and wherein a frustoconical and/or conical surface of the receiving means (34) is configured with an angle of at least 8° with respect to the axial direction (32) and not more than 45° with respect to the axial direction.

3. The cleaning device (1) according to claim 2, wherein the angle is at least 10° and not more than 30°.

4. The cleaning device (1) according to claim 2, wherein the sealing surface (35) for receiving the drinking straw (60) is configured on an outer surface (36) of the receiving means (34) or on an inner surface (37) of the receiving means (34).

5. The cleaning device (1) according to claim 1, wherein the cleaning device is made of an elastomer, silicone, acrylate rubber or natural rubber, in one piece.

6. The cleaning device (1) according to claim 1, wherein the cleaning device is manufactured using a 3D printing process.

7. The cleaning device (1) according to claim 1, wherein the manipulation portion (20) is configured such that a flow cross section for a fluid through the manipulation portion (20) decreases monotonously from the inlet cross section (11) to the outlet cross section (31), at least in sections or continuously.

8. The cleaning device (1) according to claim 1, wherein the helical element (23) comprises at least two threads.

9. The cleaning device (1) according to claim 1, wherein a pitch (25) of the at least one thread (24) relative to across-sectional plane spanned by the radial direction (33) is more than 20°.

10. The cleaning device (1) according to claim 9, wherein a pitch (25) of the at least one thread (24) in the axial direction (32) decreases at least partially or continuously from the inlet cross section (11) to the outlet cross section (31).

11. The cleaning device (1) according to claim 2, wherein the pitch (25) of the at least one thread (24) is more than 30° and less than 60°.

12. The cleaning device (1) according claim 1, wherein the connection portion (10) has a connection inner surface (12) with an inner diameter (13), is manufactured, in one piece, from an elastomer, silicone, acrylate rubber or natural rubber, such that the cleaning device (1) can be plugged onto a tap outlet (51) of the water tap (50) of a sink, wherein the tap outlet (51) has a maximum outer diameter of more than 15 mm, and less than 35 mm.

13. The cleaning device (1) according to claim 12, wherein the cleaning device (1) can be plugged onto the tap outlet having a maximum outer diameter of more than 20 mm and less than 30 mm.

14. The cleaning device (1) according to claim 12, wherein the connection portion (10) is at least partially configured in the shape of a truncated cone with an inner diameter (13) tapering at least in sections in the direction of the outlet cross section (31).

15. The cleaning device (1) according to claim 1, wherein the connection portion (10) is suitably formed as or with an adapter device (15) for fixed but removable connection to a thread (14) of the water tap (50).

16. The cleaning device (1) according claim 1, comprising a valve means (40) such that a valve cross-section (43) is released by the cleaning device (1) by exerting a contact force (42) on the outlet portion (30) and/or by moving the outlet portion (30) an axial direction (32).

17. The cleaning device (1) according to claim 16, wherein at least one valve component (41) of the valve means (40), is supported displaceably in the axial direction (32) on the cleaning device (1) such that a fluid under pressure in the cleaning device (1) can hold the at least one valve component (41) in a position such that a valve cross-section (43) is closed by the cleaning device (1).

18. The cleaning device (1) according to claim 17, wherein the outlet portion (30) is supported displaceably in the axial direction (32) on the cleaning device (1) such that a fluid under pressure in the cleaning device (1) can hold the at least one valve component (41) in a position such that a valve cross-section (43) is closed by the cleaning device (1).

19. The cleaning device (1) according to claim 1, wherein the ratio of the area of the inlet cross-section (11) to the area of the outlet cross-section (31) is more than 15 and less than 35.

* * * * *